United States Patent
Kawashima et al.

(10) Patent No.: US 12,528,051 B2
(45) Date of Patent: Jan. 20, 2026

(54) BIPOLAR MEMBRANE AND PROCESS FOR PRODUCING THE SAME

(71) Applicant: ASTOM CORPORATION, Tokyo (JP)

(72) Inventors: Minoru Kawashima, Shunan (JP); Kenji Fukuta, Shunan (JP)

(73) Assignee: ASTOM CORPORATION, Tokyo (JP)

(*) Notice: Subject to any disclaimer, the term of this patent is extended or adjusted under 35 U.S.C. 154(b) by 1179 days.

(21) Appl. No.: 16/982,275

(22) PCT Filed: Mar. 19, 2019

(86) PCT No.: PCT/JP2019/011495
§ 371 (c)(1),
(2) Date: Sep. 18, 2020

(87) PCT Pub. No.: WO2019/188596
PCT Pub. Date: Oct. 3, 2019

(65) Prior Publication Data
US 2021/0008499 A1    Jan. 14, 2021

(30) Foreign Application Priority Data

Mar. 26, 2018  (JP) .................................. 2018-058896

(51) Int. Cl.
*B01D 67/00* (2006.01)
*B01D 61/44* (2006.01)
(Continued)

(52) U.S. Cl.
CPC ....... *B01D 61/445* (2013.01); *B01D 67/0088* (2013.01); *B01D 67/0095* (2013.01);
(Continued)

(58) Field of Classification Search
CPC . B01D 61/445; B01D 67/0088; B01D 69/145
See application file for complete search history.

(56) References Cited

U.S. PATENT DOCUMENTS 5,221,455 A * 6/1993 Hanada .................. C08J 5/2275
521/27
5,227,040 A * 7/1993 Simons .................. C08J 5/2275
521/30
(Continued)

FOREIGN PATENT DOCUMENTS

| CN | 106310950 A | 1/2017 |
| CN | 107737614 A | 2/2018 |

(Continued)

OTHER PUBLICATIONS

Goering et al, "Role of ion-exchange membrane morphology and sorption properties in facilitated transport di-olefin/mono-olefin separations", Jun. 10, 1998, Journal of Membrane Science, 144, 133-143. (Year: 1998).*

(Continued)

*Primary Examiner* — Luan V Van
*Assistant Examiner* — Andrew Koltonow
(74) *Attorney, Agent, or Firm* — Birch, Stewart, Kolasch & Birch, LLP

(57) ABSTRACT

A bipolar membrane BP characterized in that particles 5 of a basic metal chloride are distributed in the interface between a cation-exchange membrane 1 and an anion-exchange membrane 3.

2 Claims, 1 Drawing Sheet

(51) Int. Cl.
    *B01D 69/02*     (2006.01)
    *B01D 69/14*     (2006.01)
    *B01J 39/04*     (2017.01)
    *B01J 39/18*     (2017.01)
    *B01J 41/04*     (2017.01)
    *B01J 41/12*     (2017.01)
    *B01J 47/12*     (2017.01)
    *C08J 5/22*     (2006.01)

(52) U.S. Cl.
    CPC .......... *B01D 69/02* (2013.01); *B01D 69/141* (2013.01); *B01D 69/145* (2013.01); *B01J 39/04* (2013.01); *B01J 39/18* (2013.01); *B01J 41/04* (2013.01); *B01J 41/12* (2013.01); *B01J 47/12* (2013.01); *C08J 5/2287* (2013.01); *B01D 2325/10* (2013.01); *B01D 2325/42* (2013.01)

(56) References Cited

U.S. PATENT DOCUMENTS

| | | | | |
|---|---|---|---|---|
| 5,401,408 A | * | 3/1995 | Umemura | B01D 61/445 210/500.25 |
| 6,596,137 B2 | * | 7/2003 | Nago | C08J 5/2275 204/632 |
| 6,924,318 B2 | * | 8/2005 | Mischi | C08J 5/2281 521/27 |
| 2003/0006138 A1 | | 1/2003 | Nago et al. | |
| 2019/0118144 A1 | | 4/2019 | Kishino et al. | |

FOREIGN PATENT DOCUMENTS

| | | | | |
|---|---|---|---|---|
| EP | 0 459 820 A2 | | 12/1991 | |
| GB | 2122543 A | * | 1/1984 | .......... B01D 61/445 |
| JP | 4-228591 A | | 8/1992 | |
| JP | 2524012 B2 | | 8/1996 | |
| JP | 2001-200079 A | | 7/2001 | |
| WO | WO 01/62384 A1 | | 8/2001 | |
| WO | WO 2017/179672 A1 | | 10/2017 | |

OTHER PUBLICATIONS

Extended European Search Report for corresponding European Application No. 19777393.0, dated Dec. 6, 2021.
International Search Report issued in PCT/JP2019/011495 (PCT/ISA/210), dated Jun. 18, 2019.

* cited by examiner

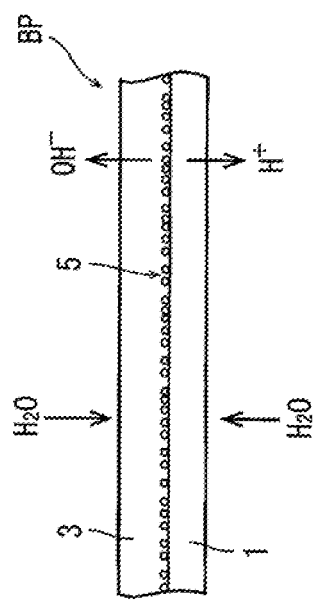

BIPOLAR MEMBRANE AND PROCESS FOR PRODUCING THE SAME

TECHNICAL FIELD

This invention relates to a bipolar membrane in which a cation-exchange membrane and an anion-exchange membrane are stuck together, and to a process for producing the same.

BACKGROUND ART

The bipolar membrane is a composite membrane in which a cation-exchange membrane and an anion-exchange membrane are stuck together, and has a function of establishing a phenomenon called water splitting which dissociates the water in the membrane into protons and hydroxide ions when a voltage is applied to both sides of the bipolar membrane which is dipped in an aqueous solution. By utilizing this function, the electrodialysis can be conducted based on a combination of the bipolar membrane and the cation-exchange membrane or the anion-exchange membrane to produce an acid and an alkali from, for example, a neutral salt.

In order to dissociate the water into protons and hydroxide ions with the application of a low voltage, the above bipolar membrane employs such a means as to provide a water splitting catalyst in the interface between the cation-exchange membrane and the anion-exchange membrane to accelerate the dissociation.

As the water splitting catalyst, a patent document 1, for example, discloses a metal oxide such as titanium oxide and proposes a bipolar membrane in which a layer of the metal oxide is provided in the interface between the cation-exchange membrane and the anion-exchange membrane.

Further, a patent document 2 teaches that heavy metal ions such as of tin and ruthenium work effectively as the water splitting catalyst, and proposes a bipolar membrane in which the surface of a cation-exchange membrane that is ionically exchanged with tin or ruthenium is coated with a polymer that has anion-exchange groups or exchange groups capable of introducing anion-exchange groups to thereby introduce the anion-exchange groups as required.

In the case of the bipolar membrane proposed by the patent document 1, however, the metal oxide used as the water splitting catalyst must be provided in the form of a dense layer in the interface between the cation-exchange membrane and the anion-exchange membrane accompanied, therefore, by such a problem that the thin film is liable to be delaminated between the cation-exchange membrane and the anion-exchange membrane after used for extended periods of time. Moreover, after the layer of the metal oxide is formed on the surface of the cation-exchange membrane (or the anion-exchange membrane), the metal oxide particles must be buried in the surface of the exchange membrane by a pressing treatment or the like treatment, accounting, therefore, for a low productivity.

In the case of the bipolar membrane of the patent document 2, on the other hand, the water splitting catalyst has a low durability. The heavy metal ions such as of tin or ruthenium disappear from the membrane as the electric current is turned on and off repetitively. As a result, the water splitting voltage increases. Therefore, improvements are necessary concerning these points.

PRIOR ART DOCUMENTS

Patent Documents

Patent document 1: Japanese Patent Laid-Open No. 2001-200079
Patent document 2: Japanese Patent No. 2524012

OUTLINE OF THE INVENTION

Problems that the Invention is to Solve

It is, therefore, an object of the present invention to provide a bipolar membrane which is free from the problem of membrane delamination and is capable of stably maintaining a low water splitting voltage over extended periods of time, as well as to provide a process for producing the same.

Means for Solving the Problems

Concerning the water splitting voltage of the bipolar membranes, the present inventors have studied the adjustment conditions for the water splitting catalyst using a metal chloride as the starting material. As a result, the inventors have discovered that the water splitting voltage can be maintained low over extended periods of time if particles of a basic metal chloride obtained by adjusting the concentration and pH of the metal chloride are distributed in the interface between the cation-exchange membrane and the anion-exchange membrane, and have thus completed the invention.

According to the present invention, there is provided a bipolar membrane in which a cation-exchange membrane and an anion-exchange membrane are joined together, characterized in that particles of a basic metal chloride are distributed in the interface between the cation-exchange membrane and the anion-exchange membrane.

In the bipolar membrane of the present invention, it is desired that:

(1) The metal contained in the basic metal chloride is Sn or Ru; and
(2) Particles of the basic metal chloride are distributed in an amount of 0.01 to 5 g/m$^2$.

According to the present invention, furthermore, there is provided a process for producing a bipolar membrane comprising the steps of:

providing an ion-exchange membrane that has been prepared in advance as a base membrane;
providing a coating liquid in which the particles of a basic metal chloride have been dispersed, and applying the coating liquid onto the surface of the base membrane followed by drying so that the particles of the basic metal chloride are distributed on the surface of the base membrane; and
applying a counter ion-exchange resin solution onto the surface of the base membrane on which the particles of the basic metal chloride have been distributed followed by drying so as to form a layer of the counter ion-exchange resin on the base membrane.

In the invention, the basic metal chloride is a polyvalent metal chloride in which hydroxide ions have been introduced, and stands for chlorides in which hydroxide ions have been introduced to different degrees and having compositions as expressed, for example, by the following formula (1), $$M(OH)xCly \tag{1}$$

wherein,
M is a polyvalent metal, and
x and y in combination represent a valence of a polyvalent metal M, and are not each 0.

Effects of the Invention

The bipolar membrane of the present invention has an important feature in that particles of a basic metal chloride are distributed in the joining interface between the cation-exchange membrane and the anion-exchange membrane.

That is, the basic metal chloride exhibits the function of a water splitting catalyst. Besides, the particles of the basic metal chloride work to lower the water splitting voltage and, at the same time, are distributed in the interface between the cation-exchange membrane and the anion-exchange membrane. Therefore, even when a flow of an electric current is sustained, a low water splitting voltage can be maintained over extended periods of time.

For example, as demonstrated in Examples appearing later (for detailed conditions, refer to the Examples), in the case of a bipolar membrane of Comparative Example 1 which has no basic metal chloride distributed therein, the initial water splitting voltage is as low as 1.2 V which, however, greatly rises to 2.1 V after the endurance test. On the other hand, in the case of the bipolar membrane of the present invention in which the particles of a basic metal chloride (basic tin (II) chloride) are distributed in the joining interface, the initial water splitting voltage is 1.1 to 1.4 V. Even after the endurance test of having flown a predetermined electric current, the water splitting voltage remains to be not higher than 1.7 V (specifically, 1.1 to 1.4 V), and the initial water splitting voltage is being maintained.

According to the present invention, as described above, the water splitting voltage can be maintained low over extended periods of time.

In the invention, though the reason has not yet been clarified why the water splitting voltage can be maintained low for extended periods of time upon distributing the particles of the basic metal chloride in the joining interface, the present inventors speculate it as described below.

That is, the water splitting catalyst containing metals tends to exhibit a higher catalytic function if it has a higher ion forming ability. Here, particles of the basic metal chloride dissolve in water to a suitable degree. Therefore, when the bipolar membrane in which the chloride particles are distributed in the joining interface thereof is dipped in an aqueous solution, the metal ions formed by the chloride that is dissolving in water undergo the ionic exchange with the ion-exchange groups in the joining interface of the ion-exchange membrane, whereby a catalytic function is exhibited to lower the water splitting voltage. Moreover, the metal ions distributed in the joining interface upon having been ionically exchanged with the ion-exchange groups are lost little by little as the electric current continues to flow. Here, in the present invention, it is presumed that the metal ions are newly fed from the particles of the basic metal chloride that are distributed in the joining interface and, as a result, a low hydrolyzing voltage is stably maintained over extended periods of time.

Moreover, unlike the metal oxides, the basic metal chloride used in the invention is capable of feeding metal ions. Therefore, the basic metal chloride has a high catalytic effect. Upon distributing the basic metal chloride in the form of very small particles and in small amounts in the joining interface, therefore, the water splitting voltage can be lowered. It is, therefore, made possible to avoid a decrease in close adhesion between the ion-exchange resins in the joining interface thereof even without carrying out any specific operation such as push-in operation that is required when a metal oxide is used. Accordingly, it is made possible to effectively avoid delamination of the membranes and hence to effectively prevent such inconveniences as evolution of blisters or swelling caused by local delamination of the membranes.

BRIEF DESCRIPTION OF THE DRAWING

FIG. 1 It is a side sectional view schematically illustrating a bipolar membrane of the present invention.

MODES FOR CARRYING OUT THE INVENTION

Referring to FIG. 1, a bipolar membrane BP of the present invention comprises a cation-exchange membrane 1 and an anion-exchange membrane 3 that are joined together. Particles 5 of a basic metal chloride are distributed as a water splitting catalyst in the joining interface thereof.

The bipolar membrane BP is dipped in an aqueous solution and a voltage is applied thereto to flow an electric current. Then water ($H_2O$) that has permeated into the bipolar membrane BP dissociates into protons (H⁺) and hydroxide ions (OH⁻), the protons being released on the side of the cation-exchange membrane 1 and the hydroxide ions on the side of the anion-exchange membrane 3. By utilizing this phenomenon, therefore, an electric current is flown in combination with the anion-exchange membrane or the cation-exchange membrane (i.e., electrodialysis) in order to form and recover, in a concentrated form, an acid or an alkali from an organic or inorganic neutral salt or to recover an acid component from a neutral salt. Particles of the basic metal chloride work as the water splitting catalyst and accelerate the dissociation of water making it, therefore, possible to dissociate the water at a low voltage.

In the bipolar membrane BP, the cation-exchange membrane 1 and the anion-exchange membrane 3 may be those that have been known per se.

<Particles 5 of the Basic Metal Chloride>

The basic metal chloride is a polyvalent metal chloride to which hydroxide ions are introduced, and no specific limitation is imposed thereon so far as it is capable of releasing metal ions as the water splitting catalyst. Usually, it has a composition represented by the following formula (1), $$M(OH)_xCl_y \quad (1)$$

wherein,

M is a polyvalent metal, and x and y in combination represent a valence of the polyvalent metal M, and are not each 0.

In the invention, the basic metal chloride has a degree of hydroxide ion introduction T defined by the following formula (2) of 20 to 95%, preferably, 30 to 90% and, more preferably, 40 to 85%, $$T(\%)=x/(x+y)\times100 \quad (2)$$

When the value T is smaller than 20%, the catalytic function may not be exhibited over extended periods of time. When the value T is higher than 90%, on the other hand, the ability for feeding metal ions decreases and a sufficiently high catalytic activity may not be obtained.

As the polyvalent metal M contained in the basic metal chloride, there can be exemplified such heavy metals as Al, Ti, Cr, Fe, Zn, Zr, Ru, Pd, Sn and Pb. From the standpoint of catalytic activity, it is preferred to use Cr, Ru and/or Sn and, more preferably, Ru and/Sn and, particularly preferably, Sn.

The particles 5 of the basic metal chloride are distributed in the interface between the cation-exchange membrane 1 and the anion-exchange membrane 3 in an amount of, preferably, 0.01 to 5 g/m², more preferably, 0.05 to 2 g/m² and, particularly preferably, 0.1 to 1 g/m².

When the particles 5 of the basic metal chloride are distributed in amounts in excess of the above-mentioned range, there may occur such inconveniences as a rise in the electric resistance of the bipolar membrane and a decrease in the adhesiveness between the cation-exchange membrane and the anion-exchange membrane. When the particles 5 of the basic metal chloride are distributed in amounts smaller than the above-mentioned range, on the other hand, metal ions can no longer be fed as the water splitting catalyst for extended periods of time. As a result, the term for maintaining a low water splitting voltage will be shortened.

It is, further, desired that the particles 5 of the basic metal chloride have a number average particle diameter (Dn) of 0.05 to 10 μm and, more preferably, 0.1 to 5 μm as found by analyzing the particle image observed by using a scanning electron microscope (SEM). To measure the number average particle diameter (Dn) by using the scanning electron microscope (SEM), not less than 100 particles are measured for their diameter based on an SEM image observed at a magnifying power of about 3,000 to about 10,000, and the number average particle diameter is found based on the thus obtained value. This is because the water splitting voltage may rise when the particles 5 of the basic metal chloride have a number average particle diameter which is not smaller than 10 μm. The reason is attributed to that since the particles 5 of the basic metal chloride have small specific surface areas, the metal ions are released at a small rate and can no longer compensate for the loss of metal ions that have flown out of the bipolar membrane. Besides, adhesiveness decreases in the interface and blisters tend to evolve.

<Production of the Bipolar Membrane BP>

The bipolar membrane BP of the invention is produced by, for example, providing an ion-exchange membrane that has been prepared in advance as the base membrane, providing a coating liquid in which the particles of the basic metal chloride have been dispersed, applying the coating liquid onto the base membrane followed by drying so that the particles 5 of the basic metal chloride are distributed on the surface of the base membrane and, next, applying a counter ion-exchange resin solution onto the base membrane followed by drying so as to form a counter ion-exchange resin layer on the base membrane.

Described below is a process for producing the bipolar membrane of the present invention of when a cation-exchange membrane 1 is used as the base membrane.

1. Forming the Cation-Exchange Membrane 1

As the cation-exchange resin for forming the cation-exchange membrane 1, there can be used the one that has been known per se. For example, there can be preferably used such a resin as polysulfone or polystyrene that has a cation-exchange group like sulfonic acid group, carboxylic acid group or phosphonic acid group introduced into an aromatic ring present in the main chain or the side chain thereof.

It is, further, desired that the cation-exchange membrane 1 contains a reinforcing member to secure the membrane strength. The reinforcing member may assume any form such as woven fabric, nonwoven fabric or porous film. From the standpoint of the strength, however, the woven fabric is preferred. As the reinforcing member, it is also allowable to use any material so far as it is capable of providing a predetermined strength. Concretely, there can be preferably used polyolefins such as polyethylene and polypropylene; polyvinyl chloride; and the like.

The cation-exchange membrane 1 can be formed according to a conventional method. Described below are some of typical methods.

That is, a reinforcing member such as woven fabric is imbibed with a monomer having a cation-exchange group, or with a crosslinking monomer (e.g., divinylbenzene, etc.) or a monomer composition containing a polymerization initiator by spraying or coating. Thereafter, the monomer composition is polymerized to form a cation-exchange resin. There is thus obtained a desired cation-exchange membrane 1.

Further, a monomer (e.g., styrene) having a reaction group capable of introducing a cation-exchange group can be used instead of using the above monomer having the cation-exchange group. The monomer is then polymerized in the same manner as described above to form a cation-exchange resin precursor. Thereafter, a desired ion-exchange group is introduced into the precursor through such a treatment as sulfonation or hydrolysis to thereby obtain a desired cation-exchange membrane 1.

The cation-exchange membrane 1 prepared as described above has a thickness in a range of, preferably, 10 to 500 μm and, more preferably, 100 to 300 μm. If the thickness is too small, the strength of the cation-exchange membrane 1 may greatly decrease. If the thickness is too large, there may occur such inconveniences as an increased membrane resistance and, as a result, an increased bipolar voltage.

The cation-exchange membrane should have an ion-exchange capacity, usually, in a range of 0.1 to 4 meq/g and, specifically, 0.5 to 2.5 meq/g from the standpoint of properties of the bipolar membrane, such as voltage drop and current efficiency. The membrane resistance, too, should be not more than 15 Ω·cm² and, specifically, should be in a range of 1 to 5 Ω·cm².

In the invention, it is desired to roughen the surface of the cation-exchange membrane 1 (surface on the side on where the particles 5 of the basic metal chloride are to be distributed) by polishing using a sand-paper or by sand-blast prior to distributing the particles 5 of the basic metal chloride on the surface of the cation-exchange membrane 1. This helps increase the anchoring effect and makes it possible to obtain a bipolar membrane featuring improved adhesiveness between the cation-exchange membrane 1 and the anion-exchange membrane 3.

2. Distributing the Particles 5 of the Basic Metal Chloride

Next, the particles 5 of the basic metal chloride are distributed on the surface of the cation-exchange membrane 1 that is formed as described above. There is no specific limitation on the method of distributing the particles 5 of the basic metal chloride. Typically, however, a coating liquid obtained by dispersing the particles of the basic metal chloride in water is applied onto the surface of the cation-exchange membrane 1 by spraying, dipping or screen-printing. Among them, the coating by dipping is desired from the cost of production and simplicity in the steps of production.

By utilizing the fact that the metal chloride is soluble in water, the coating liquid in which the particles of the basic metal chloride are dispersed is prepared by throwing the metal chloride into the water. Depending on the kind of the metal, the amount and pH of the metal chloride to be thrown into the water are adjusted so that the basic metal chloride is made present therein.

For example, the following method can be employed to prepare a coating liquid in which are dispersed the particles of the basic tin chloride (hereinafter often called basic stannous chloride) which is a representative basic metal chloride.

A first method is to have the particles of the basic tin (II) chloride precipitated by adjusting the amount of the tin (II) chloride that is thrown into the water.

That is, in an aqueous solution obtained by throwing the tin (II) chloride into the water in a manner that the amount of the tin (II) chloride is as highly concentrated as not less than 1% by mass, the tin (II) chloride, usually, remains dissolved therein under such a strongly acidic condition that the pH of the aqueous liquid is less than 1.0 since the tin (II) chloride is soluble in water.

When the amount thereof is less than 1% by mass, however, the acidity of the aqueous solution is so weakened that the pH thereof is not less than 1.0, specifically, in a range of 1.0 to 12.0 and, more particularly, 1.5 to 5.0 depending upon the amount thereof. In a state where the acidity is thus weakened, the tin (II) chloride that is dissolved undergoes the hydrolysis and forms the basic tin (II) chloride as expressed by the following formula,

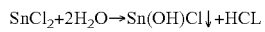

$SnCl_2 + 2H_2O \rightarrow Sn(OH)Cl \downarrow + HCL$

In this case, the basic tin (II) chloride precipitates almost all if the liquid temperature is not higher than 40° C. or, preferably, is from 5 to 35° C. Accordingly, by throwing the tin (II) chloride into water in a manner that the amount of the tin (II) chloride is less than 1% by mass, there is obtained a coating liquid in which the particles of the basic tin (II) chloride are dispersed.

For example, when the concentration (amount thrown) of the tin (II) chloride is not less than 1% by mass, there does not substantially take place the substitution into the hydroxide ions based on the above reaction. As a result, there precipitates no particle of the basic tin chloride, and the water splitting catalytic function does not last long maintaining stability.

In the invention, when coating liquid is to be prepared by adjusting the amount of the tin (II) chloride thrown into water to be less than 1% by mass, it is recommended that the tin (II) chloride is thrown in an amount of 0.05 to 0.6% by mass and, specifically, 0.1 to 0.4% by mass. When the tin (II) chloride is thrown in too small amounts, the basic metal chloride is distributed in small amounts and the water splitting catalytic function cannot be maintained for extended periods of time.

A second method is to adjust the pH of the aqueous liquid obtained by throwing the tin (II) chloride into the water.

That is, as will be comprehended from the above description, the pH of the liquid becomes less than 1.0 when it is obtained by dissolving the tin (II) chloride at a liquid temperature of not higher than 40° C. (specifically, 5 to 35° C.) at such a high concentration of not less than 1.0% by mass. Here, if a basic aqueous solution such as sodium hydroxide aqueous solution or ammonia water is added to the above highly concentrated liquid to adjust the pH to lie in a range of 1.0 to 12.0 and, preferably, 1.5 to 5.0, the basic tin (II) chloride forms and then precipitates making it possible to obtain a coating liquid in which the particles of the basic tin (II) chloride are dispersed.

For example, in a liquid of which the pH is less than 1.0, no basic tin (II) chloride precipitates. As the pH becomes not less than 12.0, on the other hand, the $Sn(OH)_2$ chiefly precipitates and the catalytic activity decreases.

When the basic tin (II) chloride is to be precipitated by adjusting the pH as described above, it is recommended that the amount of the tin (II) chloride thrown into the water is set to be, usually, 1.0 to 10.0% by mass, preferably, 1.0 to 5.0% by mass and, more preferably, 1.2 to 2.0% by mass. If thrown in too large amounts into the water, the basic tin (II) chloride precipitates acquiring too large particle diameters, which is not desirable.

When the coating solution is prepared by throwing the tin (II) chloride in an amount that is set to be less than 1.0% by mass, too, it is also allowable to adjust the pH of the liquid to lie in a range of 1.0 to 12.0 to accelerate the precipitation of the basic tin chloride.

The method of preparing the coating liquid as described above can also be applied to the preparation of a coating liquid in which there are dispersed the particles of a basic metal chloride containing metals other than tin. Specifically, the pH needs be adjusted for the preparation of a coating liquid in which there are dispersed the particles of a basic ruthenium chloride. A coating liquid in which the basic ruthenium chloride is dispersed can be obtained by adjusting the pH to be, usually, not less than 1.0 (preferably, 1.0 to 12.0 and, more preferably, 1.5 to 5.0) at a liquid temperature of not higher than 40° C. (specifically, 5 to 35° C.).

Through the step of applying the coating liquid (aqueous liquid) in which the particles of the basic metal chloride are dispersed onto the cation-exchange membrane 1, not only the particles 5 of the basic metal chloride can be distributed on the surface of the cation-exchange membrane 1 but also the metal ions in the aqueous solution can be ionically exchanged with the counter ions of the ion-exchange groups of the cation-exchange resin that constitutes the surface (joining surface) of the cation-exchange membrane 1. According to the above method, therefore, there can be prepared a bipolar membrane BP in which have already been introduced metal ions that have catalytic activity since the beginning of preparation. The bipolar membrane BP exhibits a high catalytic activity right after the start of the electrodialysis.

According to another method of distributing the particles 5 of the basic metal chloride on the cation-exchange membrane 1, a powder of the basic metal chloride is applied by being sprayed or transferred.

According to this method, prior to applying the powder of the basic metal chloride, the solution containing metal ions is applied by being dipped or sprayed so that the counter ions of the ion-exchange groups near the surface of the cation-exchange membrane 1 are ionically exchanged with the metal ions. Therefore, metal ions having catalytic activity can be introduced into the surface of the cation-exchange membrane 1 like in the case of applying the aqueous solution of the metal chloride in which the particles of the basic metal chloride have been dispersed. There is thus obtained a bipolar membrane BP that exhibits a high degree of catalytic activity right after the start of the electrodialysis.

It is also allowable to apply the powder of the basic metal chloride directly on the cation-exchange membrane 1 without exchanging ions. In this case, at a moment when the bipolar membrane BP is prepared, there is no metal ion having catalytic activity near the interface between the cation-exchange membrane 1 and the anion-exchange membrane 3. At the time of the electrodialysis, however, the bipolar membrane BP is placed in the water whereby the basic metal chloride releases metal ions that exhibit catalytic activity. Therefore, the bipolar membrane BP prepared by the above method requires some period of time before it exhibits a high degree of catalytic activity after the start of the electrodialysis. Once the metal ions are released in a predetermined amount from the basic metal chloride, however, the bipolar membrane BP exhibits the catalytic activity equivalent to that of the bipolar membrane BP prepared according to the above-mentioned method.

3. Forming the Anion-Exchange Membrane

Next, an anion-exchange membrane 3 is formed on the surface of the cation-exchange membrane 1 on which the particles 5 of the basic metal chloride have been distributed as described above. An anion-exchange resin that has been known per se. is used for forming the anion-exchange membrane 3. There is used, for example, a polysulfone or a polystyrene having anion-exchange groups such as primary to tertiary amino groups or quaternary ammonium bases introduced into aromatic rings that are present on the main chain or the side chains thereof.

There is no specific limitation on the method of forming the anion-exchange membrane 3. A representative method is, for example, the coating method.

Concretely, on the surface of the cation-exchange membrane 1, there is applied a coating liquid that contains an anion-exchange resin precursor having reaction groups capable of introducing the anion-exchange groups. Thereafter, as required, the coating liquid is dried to remove the solvent out of the coating liquid. Next, the anion-exchange resin precursor is subjected to a treatment such as amination or alkylation to introduce desired anion-exchange groups. There is thus obtained a bipolar membrane BP forming the anion-exchange membrane 3 on the cation-exchange membrane 1.

It is also allowable to form the anion-exchange resin membrane 3 in one step by applying the coating liquid containing the anion-exchange resin onto the surface of the cation-exchange membrane 1 followed by drying.

It is, further, allowable to form the anion-exchange membrane in one step even by applying, onto the surface of the cation-exchange membrane, a polar organic solvent solution containing the anion-exchange resin precursor resin having reaction groups capable of introducing the anion-exchange groups as well as an anion-exchange group introducing agent and, thereafter, removing the polar organic solvent.

It is desired that the anion-exchange membrane 3 formed as described above has a thickness in a range of 1 to 200 µm. If the thickness is too small, the strength of the anion-exchange membrane 3 may greatly decrease. If the thickness is too large, on the other hand, an inconvenience may arise such as an increase in the bipolar voltage.

Like the cation-exchange membrane which is the base material, the anion-exchange membrane should have an ion-exchange capacity which is, usually, in a range of 0.1 to 4 meq/g and, specifically, 0.5 to 2.5 meq/g from the standpoint of characteristics as the bipolar membrane.

4. After-Treatment

The anion-exchange membrane 3 after having been formed may be suitably subjected to the heat treatment. This causes the anion-exchange membrane 3 to bite into the rough surface of the cation-exchange membrane 1. As a result, the adhesion strength strikingly increases between the cation-exchange membrane 1 and the anion-exchange membrane 3. It is desired that the heat treatment is carried out at a temperature higher than a softening point of the reinforcing member in the cation-exchange membrane and under an elevated pressure to enhance the anchoring effect due to the rough surface. The pressure can be exerted by, for example, holding the bipolar membrane between the steel plates heated at a temperature in the above range or by passing the bipolar membrane between the rollers.

The bipolar membrane BP of the present invention produced as described above have the particles of the basic metal chloride distributed in the interface between the cation-exchange membrane 1 and the anion-exchange membrane 3. Therefore, the bipolar membrane BP is capable of maintaining a low water splitting voltage over extended periods of time.

Concretely, as measured in Examples appearing later, after the electrodialysis was conducted under a condition of a current density of 10 A/dm$^2$ for 6 months, the water splitting voltage could be suppressed to be not higher than the initial water splitting voltage by more than 25% of the initial water splitting voltage.

In producing, specifically, acid alkali, the bipolar membrane of the invention is allowed to employ a wide range of production conditions such as temperature and the like. Further, upon being cut into suitable sizes, the bipolar membrane is put to the use or placed in the market.

EXAMPLES

The present invention will now be concretely described by way of Examples and Comparative Examples to which only, however, the invention is in no way limited. In Examples and Comparative Examples, properties of the bipolar membrane were measured as described below.

[Measuring the Ion-Exchange Capacity of the Ion-Exchange Membrane]

The ion-exchange membrane was dipped in an aqueous solution containing 1 mol/L of HCl for not less than 10 hours.

Thereafter, in the case of the cation-exchange membrane, counter ions of the ion-exchange groups were substituted for the sodium ions from the hydrogen ions by using an aqueous solution containing 1 mol/L of NaCl, and the quantity of free hydrogen ions was determined by using a potentiometric titrator (COMTITE-900 manufactured by Hiranuma Sangyo Co.) using a sodium hydroxide aqueous solution (A mol).

In the case of the anion-exchange membrane, on the other hand, counter ions were substituted for the nitric acid ions from the chloride ions by using an aqueous solution containing 1 mol/L of NaNO$_3$, and the quantity of free chloride ions was determined by using the potentiometric titrator (COMTITE-900 manufactured by Hiranuma Sangyo Co.) using a silver nitrate aqueous solution (A mol).

Next, the same ion-exchange membrane was dipped in an aqueous solution containing 1 mol/L of NaCl for not less than 4 hours. Thereafter, the ion-exchange membrane was dried at 60° C. under a reduced pressure for 5 hours, and its dry weight (Dg) was measured. From the above measured values, the ion-exchange capacity of the ion-exchange membrane was found according to the following formula, $$\text{Ion-exchange capacity} = A \times 1000/D \text{ [meq/g--dry mass]}$$

[How to Separate the Bipolar Membrane into the Cation Membrane and the Anion Membrane]

The bipolar membrane was separated into the cation membrane and the anion membrane by using a two-compartment cell of the following constitution and by flowing an electric current under the conditions of a liquid temperature of 25° C. and an electric current density of 30 A/dm$^2$ for 5 hours. That is, in flowing the electric current in the cell of this constitution, the anode and the cathode have been reversed to that of when the electric current is flown to dissociate the water in the membrane into the protons and the hydroxide ions. When the electric current is thus flown reversely, the water splitting does not take place but protons in the hydrochloric acid aqueous solution and hydroxide ions in the sodium hydroxide aqueous solution move toward the interface of the bipolar membrane. Therefore, water is forcibly formed in the interface between the anion membrane and the cation membrane of the bipolar membrane, and an action occurs between the anion membrane and the cation membrane to separate them apart.

Cathode (Pt plate) (1.0 mol/L of NaOH)/bipolar membrane to be measured/(1.0 mol/L of HCl) anode (Pt plate)

[Confirming the Particles of the Basic Metal Chloride]

The bipolar membrane to be measured was separated into the cation membrane and the anion membrane by the method described above. Either the cation membrane or the anion membrane that was obtained was dried and, thereafter, some of the particles present on the separated surface were recovered by using a brush. The powder thereof was analyzed by using an X-ray diffraction apparatus (SmartLab manufactured by Rigaku Co.) to confirm that the individual particles were those of a basic metal chloride.

[Measuring the Amount of the Particles of the Basic Metal Chloride]

The bipolar membrane to be measured was separated into the cation membrane and the anion membrane by the method described above. By using the cation membrane and the anion membrane that were obtained, there was found the amount of the particles of the basic metal chloride present in the interface between the cation-exchange membrane and the anion-exchange membrane by a method described below.

The cation-exchange membrane and the anion-exchange membrane were each cut into a size of 10 cm$^2$, and 100 ml of an aqueous solution containing 0.5 mol/L of HCL was allowed to flow on their surfaces on the separated side to wash away all of the particles of the basic metal chloride present on the surfaces on the peeled side, and the particles that are washed away were all recovered. The recovered aqueous solution was suitably increased or decreased to become a predetermined amount, and the amount of the metal element Ag contained therein was determined by using an inductively coupled plasma emission spectrometer (iCAP 6500 DUO manufactured by Thermo Scientific Co.). The amount D (g/m$^2$) of the basic metal chloride present in the interface between the cation-exchange membrane and the anion-exchange membrane was calculated in accordance with the following formula, $$D \text{ g/m}^2 = (A \times B)/(0.001 \times C)$$

A: amount of the metal element (g),
B: molecular weight of the basic metal chloride calculated from the degree of hydroxide ion introduction T, and
C: atomic weight of the metal element.

[Measuring the Number Average Particle Diameter (Dn) of the Basic Metal Chloride]

The bipolar membrane to be measured was separated into the cation membrane and the anion membrane by the method described above. Either the cation membrane or the anion membrane that was obtained was observed by using a scanning electron microscope (SEM) (SU3500 manufactured by Hitachi High Technologies Co.) at a magnifying power of about 3,000 to about 10,000. Not less than 100 particles were measured for their diameters, and a number average particle diameter (Dn) was found based thereupon.

[Measuring the Degree of Hydroxide Ion Introduction T in the Basic Metal Chloride]

The bipolar membrane to be measured was separated into the cation membrane and the anion membrane by the method described above. Either the cation membrane or the anion membrane that was obtained was analyzed for its separated surface by using the X-ray photoelectron spectrometry (XPS), and the catalyst particles present on the separated surface were measured for their molar ratio (y) of the inorganic Cl element relative to the metal. The degree of hydroxide ion introduction T(%) was calculated according to the following formula, $$T(\%) = (\text{valence of metal} - y)/(\text{valence of metal}) - 100$$

[Measuring the Water Splitting Voltage of the Bipolar Membrane]

There was used a 4-compartment cell having the following constitution.

Here, in forming the 4-compartment cell, there was used a bipolar membrane (Neosepta BP-1E) manufactured by ASTOM Co. as the standard bipolar membrane together with the bipolar membrane (BP membrane) that was to be measured.

Anode (Pt plate) (1.0 mol/L—NaOH)/standard BP membrane/(1.0 mol/L—NaOH)/BP membrane to be measured/(1.0 mol/L—HCl)/standard BP membrane/(1.0 mol/L—HCl)/cathode (Pt plate)

The bipolar voltage was measured under the conditions of a liquid temperature of 25° C. and a current density of 10 A/dm$^2$. The water splitting voltage was measured by using the platinum wire electrodes installed sandwiching the bipolar membrane therebetween.

[Measuring the Water Splitting Efficiency of the Bipolar Membrane]

By using a 2-compartment cell having the following constitution, an electric current was flown under the conditions of a liquid temperature of 25° C. and a current density of 10 A/dm$^2$ for 20 hours and, thereafter, amounts of the acid and the base in the two compartments were determined. The current efficiencies for forming the acid and the base were calculated from the amounts of the acid and the base that were obtained, and an average value of the two was found as a water splitting efficiency of the bipolar membrane.

Anode (Pt plate) (1.0 mol/L—NaOH) 100 ml/BP membrane to be measured/(1.0 mol/L—HCl) 100 ml/cathode (Pt plate)

[Adhesiveness of the Bipolar Membrane]

The bipolar membrane was dipped in an aqueous solution of 6.0 mol/L of sodium hydroxide at 25° C. for one hour. Thereafter, the bipolar membrane was taken out and was then dipped in pure water maintained at 25° C. for one hour. After taken out from pure water, the bipolar membrane was analyzed by using an image processing system (IP-1000PC manufactured by Asahi Engineering Co.). The ratio of abnormal portions (where blisters are evolving) in one square centimeter of the membrane was calculated as the separated area (%).

[Operating the Bipolar Membrane for Extended Periods of Time]

By using the 4-compartment cell used above (for the measurement of the water splitting voltage of the bipolar membrane), the bipolar membrane was operated under the same conditions for 6 months. Thereafter, the bipolar membrane was measured for its water splitting voltage.

[Preparation of a Solution for Forming an Anion-Exchange Membrane]

100 Grams of a copolymer comprising a polystyrene segment (65% by mass) and a hydrogenated polyisoprene segment (35% by weight) was dissolved in 1000 g of chloroform followed by the addition of 100 g of a chloromethyl methyl ether and 10 g of a tin chloride to carry out the reaction at 40° C. for 15 hours.

Next, the reaction product was precipitated in methanol, washed and dried to obtain a chloromethylated styrene type block copolymer. Next, a chloromethylated polystyrene having a molecular weight of 5,000 was mixed into the above chloromethylated styrene type copolymer in such a manner that the ratio of the chloromethylated polystyrene was 40% by mass.

The thus obtained chloromethylated polymer mixture was dissolved in a tetrahydrofuran to obtain a solution containing 25% by mass thereof. To the solution was then added 8% by mass of an N,N,N',N'-tetramethyl-1,6-hexanediamine to prepare a solution for forming an anion-exchange membrane containing an anion-exchange resin precursor resin and an anion-exchange group introducing agent.

Example 1

As a cation-exchange membrane, there was provided the Neosepta CMX produced by ASTOM Co. (containing a polyvinyl chloride woven fabric as a reinforcing material, having a cation-exchange capacity of 1.6 meq/g and a membrane resistance of 2.8 $\Omega \cdot cm^2$).

The tin (II) chloride was dissolved in water of 25° C. to a concentration of 0.4% by mass, stirred and was left to stand for 30 minutes. There was obtained a suspension thereof with particles being precipitated therein.

The suspension was used as a catalyst particle coating liquid.

Next, the above-mentioned cation-exchange membrane of which the surface has been formed rugged by using a sand-paper (CC 200 Cw) was dipped in the above catalyst particle coating liquid maintained at 25° C. for one hour. Thereafter, the cation-exchange membrane was air-dried at room temperature so that the catalyst particles were distributed on the surface thereof. The solution for forming an anion-exchange membrane was applied onto one surface of the cation-exchange membrane and was left to stand at room temperature to form an anion-exchange membrane. A bipolar membrane was thus prepared.

The solution for forming the anion-exchange membrane was also applied onto a polyester film, left to stand and dried at room temperature to obtain an anion-exchange membrane. The anion-exchange membrane was measured for its anion-exchange capacity to be 1.8 meq/g. It was, therefore, confirmed that the anion-exchange membrane of the above bipolar membrane also possessed a comparable anion-exchange capacity.

With regard to the above bipolar membrane, it was confirmed relying on the above method that the particles present in the interface between the cation-exchange membrane and the anion-exchange membrane were the particles of the basic tin (II) chloride. Moreover, the amount of the basic tin (II) chloride was measured to be 0.5 $g/m^2$.

Further, the particles of the basic tin (II) chloride possessed a number average particle diameter (Dn) of 2 μm and a degree of hydroxide ion introduction T of 60%.

The bipolar membrane was, further, measured for its properties to have a water splitting voltage of 1.1 V and a water splitting efficiency of 99.5%.

Moreover, the membrane was measured for its water splitting voltage over a long period of time. It was found that the water splitting voltage was 1.1 V when the electric current was initially flown and was also 1.1 V after the current was continuously flown for 6 months. The bipolar membrane was also measured for its adhesiveness, and it was found that no bubble was evolving.

Example 2

A bipolar membrane was prepared by conducting the same operation as that of Example 1 but preparing the catalyst particle coating liquid by dissolving the tin (II) chloride in water of 25° C. to a concentration of 0.9% by mass.

With regard to the obtained bipolar membrane, it was confirmed relying on the above method that the particles present in the interface between the cation-exchange membrane and the anion-exchange membrane were the particles of the basic tin (II) chloride.

The amount of the particles of the basic tin (II) chloride was measured to be 1.0 $g/m^2$.

Further, the particles of the basic tin (II) chloride possessed a number average particle diameter (Dn) of 3 μm and a degree of hydroxide ion introduction T of 25%.

The bipolar membrane was measured for its properties to obtain the results as shown in Table 1.

Example 3

A bipolar membrane was prepared by conducting the same operation as that of Example 1 but preparing the catalyst particle coating liquid by dissolving the tin (II) chloride in water of 25° C. to a concentration of 0.05% by mass.

With regard to the obtained bipolar membrane, it was confirmed relying on the above method that the particles present in the interface between the cation-exchange membrane and the anion-exchange membrane were the particles of the basic tin (II) chloride.

Further, the amount of the particles of the basic tin (II) chloride was measured to be 0.09 $g/m^2$.

Moreover, the particles of the basic tin (II) chloride possessed a number average particle diameter (Dn) of 1 μm and a degree of hydroxide ion introduction T of 80%.

The bipolar membrane was measured for its properties to obtain the results as shown in Table 1.

Example 4

A bipolar membrane was prepared by conducting the same operation as that of Example 1 but preparing the catalyst particle coating liquid by dissolving the tin (II) chloride in water of 25° C. to a concentration of 0.4% by mass, adding, with stirring, the sodium hydroxide thereto to adjust the pH to be 2.0, and leaving the mixture thereof to stand for 30 minutes.

With regard to the obtained bipolar membrane, it was confirmed relying on the above method that the particles present in the interface between the cation-exchange membrane and the anion-exchange membrane were the particles of the basic tin (II) chloride.

Further, the amount of the particles of the basic tin (II) chloride was measured to be 0.6 $g/m^2$.

Moreover, the particles of the basic tin (II) chloride possessed a number average particle diameter (Dn) of 2 μm and a degree of hydroxide ion introduction T of 65%.

The bipolar membrane was measured for its properties to obtain the results as shown in Table 1.

Example 5

A bipolar membrane was prepared by conducting the same operation as that of Example 4 but preparing the catalyst particle coating liquid by dissolving the ruthenium (III) chloride in water of 25° C. to a concentration of 1.0% by mass, adding, with stirring, the sodium hydroxide thereto to adjust the pH to be 2.0, and leaving the mixture thereof to stand for 30 minutes.

With regard to the above bipolar membrane, it was confirmed relying on the above method that the particles present in the interface between the cation-exchange membrane and the anion-exchange membrane were the particles of the basic ruthenium (III) chloride.

Further, the amount of the particles of the basic ruthenium (III) chloride was measured to be 0.4 g/m$^2$.

Moreover, the particles of the basic ruthenium (III) chloride possessed a number average particle diameter (Dn) of 2 μm and a degree of hydroxide ion introduction T of 42%.

The bipolar membrane was measured for its properties to obtain the results as shown in Table 1.

Example 6

A bipolar membrane was prepared by conducting the same operation as that of Example 4 but preparing the catalyst particle coating liquid by dissolving the ruthenium (III) chloride in water of 25° C. to a concentration of 3.0% by mass, adding, with stirring, the sodium hydroxide thereto to adjust the pH to be 2.5, and leaving the mixture thereof to stand for 30 minutes.

With regard to the obtained bipolar membrane, it was confirmed relying on the above method that the particles present in the interface between the cation-exchange membrane and the anion-exchange membrane were the particles of the basic ruthenium (III) chloride.

The amount of the particles of the basic ruthenium (III) chloride was measured to be 1.1 g/m$^2$.

Further, the particles of the basic ruthenium (III) chloride possessed a number average particle diameter (Dn) of 4 μm and a degree of hydroxide ion introduction T of 50%.

The bipolar membrane was measured for its properties to obtain the results as shown in Table 1.

Example 7

A bipolar membrane was prepared by conducting the same operation as that of Example 1 but using, as the solution for forming the anion-exchange membrane, a solution obtained by dissolving an aminoated polysulfone (polysulfone that is chloromethylated and is then quaternary ammoniated with a trimethylamine) in a mixed solvent of methanol/chloroform (1:1 vol) in an amount of 15% by mass.

In the thus obtained bipolar membrane, the anion-exchange membrane possessed an anion-exchange capacity of 1.7 meq/g.

With regard to the thus obtained bipolar membrane, it was confirmed relying on the above method that the particles present in the interface between the cation-exchange membrane and the anion-exchange membrane were the particles of the basic tin (II) chloride.

Further, the amount of the particles of the basic tin (II) chloride was measured to be 0.6 g/m$^2$. Moreover, the particles of the basic tin (II) chloride possessed a number average particle diameter (Dn) of 2 μm and a degree of hydroxide ion introduction T of 60%.

The bipolar membrane was measured for its properties to obtain the results as shown in Table 1.

Example 8

There was prepared a monomer composition comprising 70 parts by mass of styrene, 20 parts by mass of chloromethylstyrene, 10 parts by mass of divinylbenzene (57% product), 5 parts by mass of benzoyl peroxide, 10 parts by mass of acetyl tributyl citrate, and 50 parts by mass of polyvinyl chloride powder, and in which a polyethylene woven fabric (50 deniers, mesh longitudinal:transverse 156:100/inch, monofilament, filament diameter 86 μm) was dipped under the atmospheric pressure at 25° C. for 10 minutes to have the monomer composition adhered thereon.

The woven fabric was then taken out of the monomer composition, and a polyethylene terephthalate film 100 μm in thickness was applied as a separating material to both sides of the membrane which was then heat-polymerized under an elevated pressure at 80° C. for 5 hours. The obtained membrane was dipped in a mixture of 98% concentrated sulfuric acid and chlorosulfonic acid of a purity of not lower than 90% at 40° C. for 60 minutes to obtain a sulfonic acid type cation-exchange membrane (cation-exchange capacity of 2.1 meq/g, membrane resistance of 2.6 Ω·cm$^2$).

A bipolar membrane was prepared by conducting the same operation as that of Example 1 but using, as a cation-exchange membrane, the sulfonic acid type cation-exchange membrane prepared above.

With regard to the above bipolar membrane, it was confirmed relying on the above method that the particles present in the interface between the cation-exchange membrane and the anion-exchange membrane were the particles of the basic tin (II) chloride.

The amount of the particles of the basic tin (II) chloride was also measured to be 0.5 g/m$^2$.

Further, the particles of the basic tin (II) chloride possessed a number average particle diameter (Dn) of 2 μm and a degree of hydroxide ion introduction T of 60%.

The bipolar membrane was measured for its properties to obtain the results as shown in Table 1.

Example 9

There was prepared a monomer composition comprising 70 parts by mass of styrene, 20 parts by mass of chloromethylstyrene, 10 parts by mass of divinylbenzene (57% product), 5 parts by mass of benzoyl peroxide, 10 parts by mass of acetyl tributyl citrate, and 50 parts by mass of polyvinyl chloride powder, and in which a polyethylene nonwoven fabric (porosity 78%, weight 10 g/m$^2$, fiber diameter 12 μm) was dipped under the atmospheric pressure at 25° C. for 10 minutes to have the monomer composition adhered thereon.

The nonwoven fabric was then taken out of the monomer composition, and a polyethylene terephthalate film 100 μm in thickness was applied as a separating material to both sides of the membrane which was then heat-polymerized under an elevated pressure at 80° C. for 5 hours.

The obtained membrane was dipped in a mixture of 98% concentrated sulfuric acid and chlorosulfonic acid of a purity of not lower than 90% at 40° C. for 60 minutes to obtain a sulfonic acid type cation-exchange membrane (cation-exchange capacity of 2.5 meq/g, membrane resistance of 1.8 Ω·cm$^2$).

A bipolar membrane was prepared by conducting the same operation as that of Example 1 but using, as a cation-exchange membrane, the sulfonic acid type cation-exchange membrane prepared above.

With regard to the above bipolar membrane, it was confirmed relying on the above method that the particles present in the interface between the cation-exchange membrane and the anion-exchange membrane were the particles of the basic tin (II) chloride.

The amount of the particles of the basic tin (II) chloride was also measured to be 0.5 g/m$^2$.

Further, the particles of the basic tin (II) chloride possessed a number average particle diameter (Dn) of 2 μm and a degree of hydroxide ion introduction T of 60%.

The bipolar membrane was measured for its properties to obtain the results as shown in Table 1.

Example 10

The tin (II) chloride was dissolved in water of 25° C. to a concentration of 0.6% by mass, stirred and was left to stand for 30 minutes. There was obtained a suspension thereof with particles precipitated therein. The suspension was filtered, and the filtrate was dried to obtain a particulate powder of the catalyst.

A bipolar membrane was prepared by conducting the same operation as that of Example 1 but distributing the particles of the catalyst on the surface of the cation-exchange membrane in a manner of applying by fingers the above particulate catalyst powder on the surface of the cation-exchange membrane that has been rendered rugged in advance by using a sand-paper.

With regard to the thus obtained bipolar membrane, it was confirmed relying on the above method that the particles present in the interface between the cation-exchange membrane and the anion-exchange membrane were the particles of the basic tin (II) chloride.

The amount of the particles of the basic tin (II) chloride was also measured to be 2.0 g/m$^2$.

Further, the particles of the basic tin (II) chloride possessed a number average particle diameter (Dn) of 3 μm and a degree of hydroxide ion introduction T of 38%.

The bipolar membrane was measured for its properties to obtain the results as shown in Table 1.

Example 11

The ruthenium (III) chloride was dissolved in water of 25° C. to a concentration of 0.9% by mass, and to which sodium hydroxide was added with stirring to adjust the pH to be 2.0. The mixture thereof was left to stand for 30 minutes. There was obtained a suspension thereof with particles being precipitated therein. The suspension was filtered, and the filtrate was dried to obtain a particulate powder of the catalyst.

A bipolar membrane was prepared by conducting the same operation as that of Example 10 but using the above particulate catalyst powder as the catalyst powder that was to be applied by fingers onto the surface of the cation-exchange membrane.

With regard to the above bipolar membrane, it was confirmed relying on the above method that the particles present in the interface between the cation-exchange membrane and the anion-exchange membrane were the particles of the basic ruthenium (III) chloride.

The amount of the particles of the basic ruthenium (III) chloride was also measured to be 2.2 g/m$^2$.

Further, the particles of the basic ruthenium (III) chloride possessed a number average particle diameter (Dn) of 3 μm and a degree of hydroxide ion introduction T of 45%.

The bipolar membrane was measured for its properties to obtain the results as shown in Table 1.

Example 12

As an anion-exchange membrane, there was provided the Neosepta AMX produced by ASTOM Co. (containing a polyvinyl chloride woven fabric as a reinforcing material, having an anion-exchange capacity of 1.5 meq/g and a membrane resistance of 2.4 Ω·cm$^2$).

As the catalyst particle coating liquid, there was used the same suspension as the one used in Example 1 obtained as an aqueous liquid containing the tin (II) chloride at a concentration of 0.4% by mass.

The anion-exchange membrane of which the surface has been rendered rugged by using the sand-paper (CC 200 Cw) was dipped in the catalyst particle coating liquid maintained at 25° C. for one hour. Thereafter, the anion-exchange membrane was air-dried at room temperature so that the catalyst particles were distributed on the surface thereof.

The solution for forming a cation-exchange membrane was applied onto one surface of the anion-exchange membrane and was left to stand at room temperature to form a cation-exchange membrane. A bipolar membrane was thus prepared.

As the solution for forming the cation-exchange membrane, there was used a solution obtained by dissolving a sulfonated polyether ether ketone in a tetrahydrofuran to a concentration of 20% by mass.

The solution for forming the cation-exchange membrane was also applied onto a polyester film, left to stand and dried at room temperature to obtain a cation-exchange membrane. The cation-exchange membrane was measured for its cation-exchange capacity to be 2.1 meq/g. It was, therefore, confirmed that the cation-exchange membrane of the above bipolar membrane also possessed a comparable cation-exchange capacity.

With regard to the above bipolar membrane, it was confirmed relying on the above method that the particles present in the interface between the cation-exchange membrane and the anion-exchange membrane were the particles of the basic tin (II) chloride.

Moreover, the amount of the basic tin (II) chloride was measured to be 0.4 g/m$^2$.

Further, the particles of the basic tin (II) chloride possessed a number average particle diameter (Dn) of 2 μm and a degree of hydroxide ion introduction T of 60%.

The bipolar membrane was, further, measured for its properties to obtain the results as shown in Table 1.

Example 13

A bipolar membrane was prepared by conducting the same operation as that of Example 1 but preparing the catalyst particle coating liquid by dissolving the tin (II) chloride in water of 25° C. to a concentration of 0.01% by mass.

With regard to the above bipolar membrane, it was confirmed relying on the above method that the particles present in the interface between the cation-exchange membrane and the anion-exchange membrane were the particles of the basic tin (II) chloride.

The amount of the particles of the basic tin (II) chloride was measured to be 0.08 g/m$^2$.

Further, the particles of the basic tin (II) chloride possessed a number average particle diameter (Dn) of 1 μm and a degree of hydroxide ion introduction T of 82%.

The bipolar membrane was measured for its properties to obtain the results as shown in Table 1.

Example 14

A bipolar membrane was prepared by conducting the same operation as that of Example 1 but applying the catalyst powder by fingers in an adjusted amount onto the surface of the cation-exchange membrane so that the particles of the basic ruthenium (III) chloride were present in an amount of 6.0 g/m² in the interface between the cation-exchange membrane and the anion-exchange membrane of the obtained bipolar membrane.

In the thus obtained bipolar membrane, the particles of the basic ruthenium (III) chloride possessed a number average particle diameter (Dn) of 3 μm and a degree of hydroxide ion introduction T of 45%.

The bipolar membrane was measured for its properties to obtain the results as shown in Table 1.

Comparative Example 1

A bipolar membrane was prepared by conducting the same operation as that of Example 1 but using, as the catalyst particle coating liquid, an aqueous solution containing 2.5% by mass of the tin (II) chloride.

In the thus obtained bipolar membrane, the amount of the catalyst particles present in the interface between the cation-exchange membrane and the anion-exchange membrane was measured to be 0.4 g/m².

Further, the particles of the catalyst possessed a number average particle diameter (Dn) of 6 μm and a degree of hydroxide ion introduction T of 0%.

The bipolar membrane was measured for its properties to obtain the results as shown in Table 1.

Comparative Example 2

A bipolar membrane was prepared by conducting the same operation as that of Example 4 but preparing the catalyst particle coating liquid by dissolving the ruthenium (III) chloride in water of 25° C. to a concentration of 2.5% by mass, adding, with stirring, the sodium hydroxide thereto to adjust the pH to be 13.0, and leaving the mixture thereof to stand for 30 minutes.

In the thus obtained bipolar membrane, the amount of the catalyst particles present in the interface between the cation-exchange membrane and the anion-exchange membrane was measured to be 1.1 g/m².

Further, the catalyst particles possessed a number average particle diameter (Dn) of 3 μm and a degree of hydroxide ion introduction T of 100%.

The bipolar membrane was measured for its properties to obtain the results as shown in Table 1.

The following abbreviations were used in Table 1.
Amount of catalyst: Cat-am
Number average particle diameter (Dn): Nm-av (Dn)
Degree of hydroxide ion introduction T: OHCPD-Int T
water splitting voltage: Wat-Volt
water splitting efficiency: Wat-Eff
Removed area: PL-Area
water splitting voltage after operated for extended periods of time: LongDr Wat-Volt

TABLE 1

| | Cat-am g/m² | Nm-av (Dn) μm | OHCPD-Int T % | Wat-Volt V | Wat-Eff % | PL-area % | LongDr Wat-Volt V |
|---|---|---|---|---|---|---|---|
| Example 1 | 0.5 | 2 | 60 | 1.1 | 99.5 | 0 | 1.1 |
| Example 2 | 1.0 | 3 | 25 | 1.2 | 99.4 | 0 | 1.4 |
| Example 3 | 0.09 | 1 | 80 | 1.1 | 99.6 | 0 | 1.2 |
| Example 4 | 0.6 | 2 | 65 | 1.1 | 99.4 | 0 | 1.2 |
| Example 5 | 0.4 | 2 | 42 | 1.1 | 99.3 | 0 | 1.1 |
| Example 6 | 1.1 | 4 | 50 | 1.3 | 99.5 | 0 | 1.4 |
| Example 7 | 0.6 | 2 | 60 | 1.1 | 99.0 | 0 | 1.2 |
| Example 8 | 0.5 | 2 | 60 | 1.1 | 99.1 | 0 | 1.2 |
| Example 9 | 0.5 | 2 | 60 | 1.2 | 98.9 | 0 | 1.3 |
| Example 10 | 2.0 | 3 | 38 | 1.3 | 99.4 | 10 | 1.4 |
| Example 11 | 2.2 | 3 | 45 | 1.3 | 99.4 | 15 | 1.4 |
| Example 12 | 0.4 | 2 | 60 | 1.3 | 99.0 | 0 | 1.3 |
| Example 13 | 0.08 | 1 | 82 | 1.1 | 99.3 | 0 | 1.3 |
| Example 14 | 6.0 | 3 | 45 | 1.4 | 99.3 | 20 | 1.7 |
| Comp. Ex. 1 | 0.4 | 6 | 0 | 1.2 | 99.4 | 0 | 2.1 |
| Comp. Ex. 2 | 1.1 | 3 | 100 | 1.4 | 99.2 | 0 | 2.2 |

DESCRIPTION OF REFERENCE NUMERALS

BP: bipolar membrane
1: cation-exchange membrane
3: anion-exchange membrane
5: particles of a basic metal chloride

The invention claimed is:

1. A bipolar membrane in which a cation-exchange membrane and an anion-exchange membrane are joined together, characterized in that particles of a basic metal chloride are distributed in the interface between said cation-exchange membrane and said anion-exchange membrane,
   wherein the particles of said basic metal chloride are distributed in an amount of 0.1 to 1 g/m², wherein said basic metal chloride is a polyvalent metal chloride to which hydroxide ions are introduced, and the degree of hydroxide ion introduction is 20 to 90%,
   wherein the particles of said basic metal chloride have a number average particle diameter of 0.05 μm to 10 μm,
   wherein the bipolar membrane (1 cm²) has no separated portion where blisters have evolved on its surface, after being dipped in an aqueous solution of 6.0 mol/L of sodium hydroxide at 25° C. for one hour, taken out from the aqueous solution, dipped in pure water maintained at 25° C. for one hour, and taken out from the pure water,
   wherein the cation-exchange membrane is formed of a resin that has a cation-exchange group introduced into an aromatic ring present in a main chain or a side chain thereof,
   wherein the anion-exchange membrane is formed of a resin that has an anion-exchange group introduced into an aromatic ring present in a main chain or a side chain thereof,
   wherein the metal contained in said basic metal chloride is Sn or Ru.

2. A process for producing the bipolar membrane of claim 1, comprising the steps of:
   providing an ion-exchange membrane that has been prepared in advance as a base membrane;
   providing a coating liquid in which the particles of said basic metal chloride have been dispersed and applying the coating liquid onto the surface of said base membrane followed by drying so that the particles of said basic metal chloride are distributed on the surface of said base membrane; and applying a counter ion-exchange resin solution onto the surface of said base membrane on which the particles of said basic metal chloride have been distributed followed by drying so as to form a layer of the counter ion-exchange resin on said base membrane;

wherein either (a) the base membrane is the cation-exchange membrane and the counter ion-exchange resin is the resin comprising an anion-exchange group, or (b) the base membrane is the anion-exchange membrane and the counter ion-exchange resin is the resin comprising a cation-exchange group.

\* \* \* \* \*